United States Patent
Houjou

[11] Patent Number: 5,987,006
[45] Date of Patent: Nov. 16, 1999

[54] TRANSMISSION METHOD IN NETWORK SYSTEM USING MULTIPLEX LINE, NETWORK SYSTEM USING THE TRANSMISSION METHOD, AND TERMINAL EQUIPMENT USED IN THE NETWORK SYSTEM

[75] Inventor: Kazuhiko Houjou, Kawasaki, Japan

[73] Assignee: Canon Kabushiki Kaisha, Japan

[21] Appl. No.: 08/858,487

[22] Filed: May 19, 1997

[30] Foreign Application Priority Data

May 27, 1996 [JP] Japan ................................. 8-131863

[51] Int. Cl.⁶ ............................ H04L 12/40; H04J 3/02
[52] U.S. Cl. ........................ 370/235; 370/395; 370/462
[58] Field of Search ........................... 370/438, 439, 370/440, 447, 458, 459, 461, 462, 235, 395

[56] References Cited

U.S. PATENT DOCUMENTS 5,157,659 10/1992 Schenkel ............................. 370/447
5,214,645 5/1993 Hagirahim ........................... 370/440

FOREIGN PATENT DOCUMENTS 7-99501 5/1995 Japan .
7-312586 11/1995 Japan .

*Primary Examiner*—Alpus H. Hsu
*Assistant Examiner*—Afsar M. Qureshi
*Attorney, Agent, or Firm*—Fitzpatrick, Cella, Harper & Scinto

[57] ABSTRACT

In a network system, a plurality of terminals are serially connected using a multiplex line and the multiplex line includes at least one first channel for transmitting a cell in a first direction and at least one second channel for transmitting a cell in a second direction, which is opposite to the first direction. In a transmission method to be performed in the network system, a terminal out of the plural terminals, which has a request for writing data in a cell transmitted through the second channel, writes a write request in a cell transmitted through the first channel and having no write request written therein, and sends out this cell. Each of the plural terminals counts the number of a cell or cells having the write request written therein and transmitted through the first channel or channels. The terminal, which has sent out the cell having the write request written therein, writes data in a write-performable cell transmitted through the second channel and sends out this cell after allowing a write-performable cell or cells transmitted through the second channel or channels to pass. The number of the passing write-performable cell or cells is equal to the number of the cell or cells having the write request written therein, transmitted through the first channel or channels and counted before this terminal sends out the cell having the write request written therein.

24 Claims, 11 Drawing Sheets

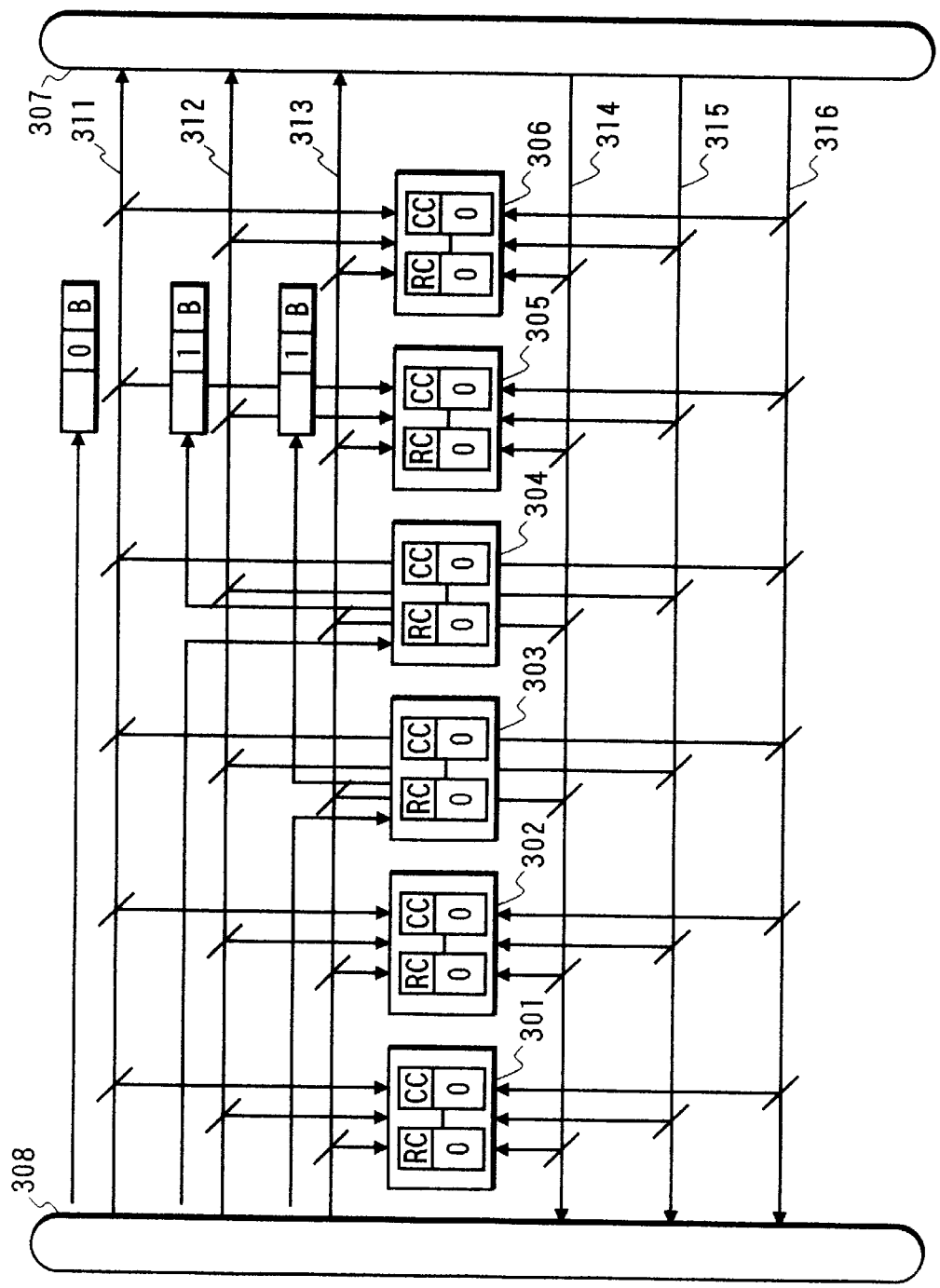

TRANSMISSION METHOD IN NETWORK SYSTEM USING MULTIPLEX LINE, NETWORK SYSTEM USING THE TRANSMISSION METHOD, AND TERMINAL EQUIPMENT USED IN THE NETWORK SYSTEM

BACKGROUND OF THE INVENTION

1. Field of the Invention

The present invention relates to a network system using at least a multiplex line, and more particularly to a network system in which a plurality of terminals are serially connected using at least a multiplex line and a network system using a DQDB protocol as a transmission protocol.

2. Related Background Art

In recent years, as a system for transmitting and receiving data among a plurality of computers has been developed, there has occurred a desire for establishing a large number of communication channels in the system. In order to increase the number of the communication channels, there have been presently proposed a method for increasing the multiplex magnitude of time division multiplexing by increasing the transmission capacity of a transmission line and a method for increasing the number of wavelength multiplex channels by converting respective data into optical signals of different wavelengths and transmitting these optical signals to an optical fiber.

In the method of multiplexing optical signals at plural different wavelengths in an optical fiber, transmission data can be assigned to each wavelength and the following communication can be attained.

At present, there exist Ethernet, FDDI (Fiber Distributed Data Interface), DQDB (Distributed Queue of the Dual Bus), FFOL (FDDI Follow On Lan) and so forth, as communication protocols for local area networks. Those protocols can be used as optical communication protocols for the respective wavelengths, and thus respective terminals can freely perform communications based on those respective communication protocols only by using a single optical fiber to connect those terminals. Further, since the transmission speed of each communication protocol is standardized, the transmission capacity needed in the network system can be flexibly coped with by using the same communication protocol for the respective optical communications of the plural different wavelengths.

Further, Japanese Patent Laid-Open Application Nos. 7-99501 and 7-312586 disclose art according to which there are arranged a main signal line having a plurality of multiplex channels and a control signal line having channels for transmitting signals in mutually-opposite directions, a request slot is transmitted through one of the channels in the control signal line, and the acquisition of a channel management table transmitted through the other channel in the control signal line is executed on the basis of the count value of the request slot. Further, there is also disclosed art for multiplexing the main signal line and the control signal line and art for performing assignment of a portion of channels in the control signal line by using the channel assign method. Those references, however, do not disclose art for providing a plurality of channels for at least one of the mutually-opposite directional channels in the control signal line and multiplexing those plural channels.

SUMMARY OF THE INVENTION

An object of the present invention is to provide a new transmission method in a network system using at least a multiplex line.

To achieve the object of the present invention, there is provided a transmission method in a network system in which a plurality of terminals are serially connected using a multiplex line, which includes n numbered first channel or channels for transmitting a cell in a first direction and m numbered second channel or channels for transmitting a cell in a second direction, which is opposite to the first direction, where n and m are respectively natural numbers and at least one of n and m is equal to or more than two (2).

The transmission method includes:

a step of causing a terminal out of the plural terminals, which has a request for writing data in a cell transmitted through the second channel, to write a write request in a cell transmitted through the first channel and having no write request written therein, and send out this cell;

a step of causing each of the plural terminals to count the number of a cell or cells transmitted through the respective first channel or channels and having the write request written therein; and a step of causing the terminal, which has sent out the cell having the write request written therein, to write data in a write-performable cell transmitted through the second channel and send out this cell after allowing a write-performable cell or cells transmitted through the second channel or channels to pass, the number of the passing write-performable cell or cells being equal to the number of the cell or cells having the write request therein, transmitted through the first channel or channels and counted by this terminal (in this specification the terminal under discussion is referred to as this terminal) before this terminal sends out the cell having the write request written therein.

Specifically, according to the present invention, the following constructions are possible in order that a use rate or traffic of each channel is made as equal as possible.

The natural number of n is equal to or more than two (2), and the counting is conducted by counting the sum of the numbers of the cell or cells transmitted through the respective first channels and having the write request written therein;

The natural number of m is equal to or more than two (2), and the write-performable cell or cells is allowed to pass until the sum of the numbers of the write-performable cell or cells transmitted through the respective second channels amounts to the number of the cell or cells transmitted through the first channel or channels, having the write request written therein and counted by this terminal before this terminal sends out the cell having the write request written therein; and The natural numbers of n and m are respectively equal to or more than two (2), the counting is conducted by counting the sum of the numbers of the cell or cells transmitted through the respective first channels and having the write request written therein, and the write-performable cell or cells is allowed to pass until the sum of the numbers of the write-performable cell or cells transmitted through the respective second channels amounts to the number of the cell or cells transmitted through the first channels, having the write request written therein and counted by this terminal before this terminal sends out the cell having the write request written therein.

The numbers of the cell or cells transmitted through the respective first channels and having the write request written therein are not separately counted, but instead the sum of those numbers of the cell or cells is counted such that the plural first channels are integrated to be treated as if those first channels were a single channel. Further, the numbers of the write-performable cell or cells transmitted through the respective second channels and allowed to pass are not determined for each second channel, but instead the sum of the numbers of the write-performable cell or cells transmitted through the respective second channels is monitored such that the plural second channels are integrated to be treated as if those second channels were a single channel.

Further, the terminal includes two counters of first and second counters, the first counter counts the number of the cell or cells transmitted through each first channel and having the write request written therein, and a value counted by the first counter is shifted to the second counter when this terminal writes the write request in the cell transmitted through the first channel and having no write request therein and sends out this cell. Hence, the counting can be performed in such a manner that a count at the time before this terminal writes the write request in the cell having no write request therein and sends out this cell is distinguished from a count at the time after this terminal writes the write request in the cell having no write request therein and sends out this cell.

Further, in order to also write data in the cell transmitted through the first channel, the transmission method only needs to further include:

a step of causing a terminal out of the plural terminals, which has a request for writing data in a cell transmitted through the first channel, to write a write request in a cell transmitted through the second channel and having no write request written therein, and send out this cell;

a step of causing each of the plural terminals to count the number of cell or cells transmitted through the respective second channel or channels and having the write request written therein; and a step of causing the terminal, which has written the write request in the cell transmitted through the second channel and having no write request written therein and has sent out this cell, to write data in a write-performable cell transmitted through the first channel and send out this cell after allowing a write-performable cell or cells transmitted through the first channel or channels to pass, the number of the passing write-performable cell or cells being equal to the number of the cell or cells having the write request written therein, transmitted on the second channel or channels and counted by this terminal before this terminal sends out the cell having the write request written therein.

Also in such a case, the terminal includes two counters of first and second counters, the first counter counts the number of the cell or cells transmitted through the respective second channel or channels and having the write request written therein, and a value counted by the first counter is shifted to the second counter when this terminal writes the write request in the cell transmitted through the second channel and having no write request therein and sends out this cell. Hence, the counting can be performed in such a manner that a count at the time before this terminal writes the write request in the cell having no write request therein and sends out this cell is distinguished from a count at the time after this terminal writes the write request in the cell having no write request therein and sends out this cell.

BRIEF DESCRIPTION OF THE DRAWINGS

FIG. 11 is a view showing the operation of writing transmission data by each terminal according to the present invention.

DETAILED DESCRIPTION OF THE PREFERRED EMBODIMENTS

Details of embodiments according to the present invention will be described with reference to the figures.

[First Embodiment]

Figure 1:
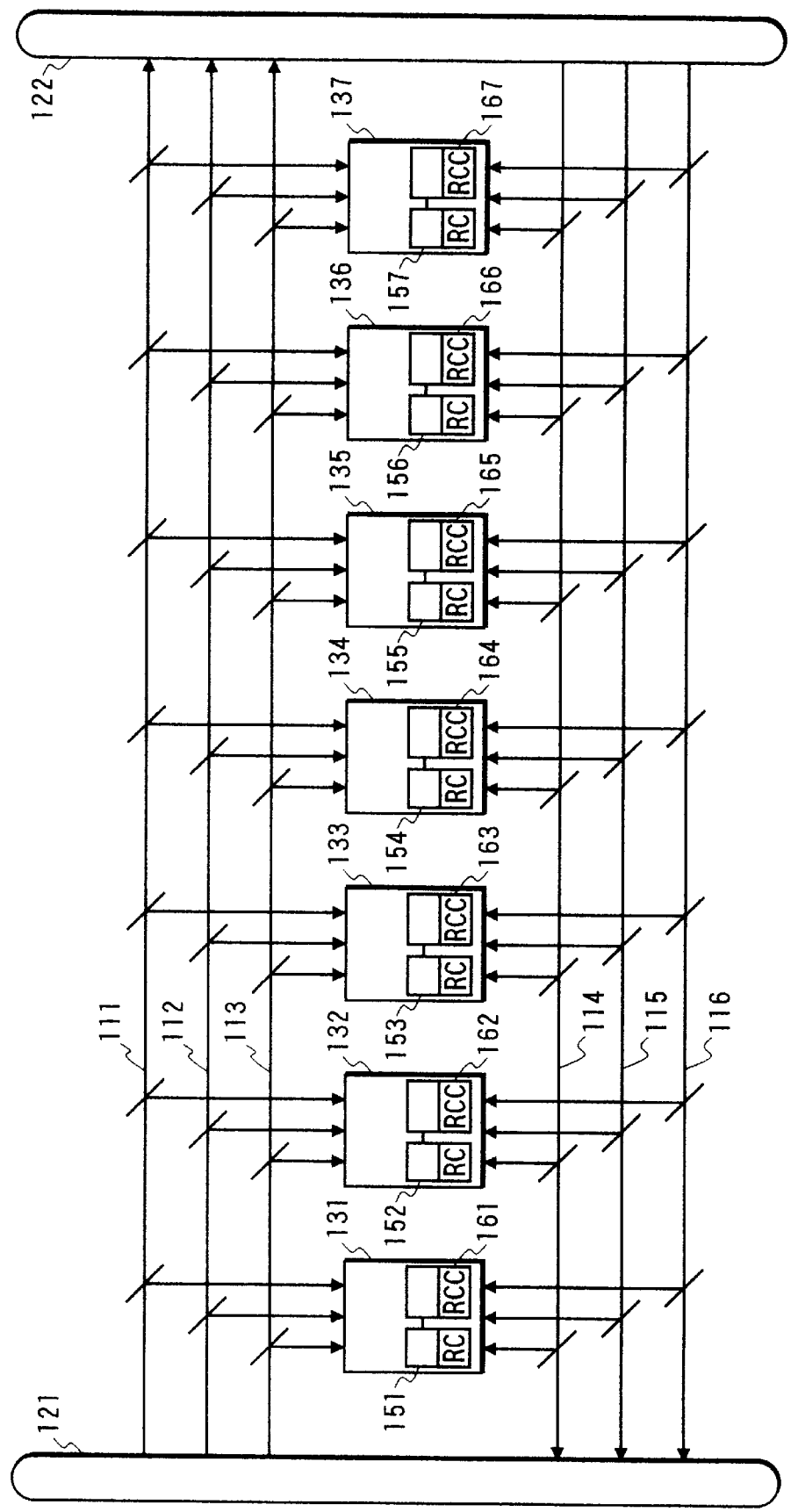
FIG. 1 illustrates the structure of an optical communication network according to the present invention.
Figure 2:
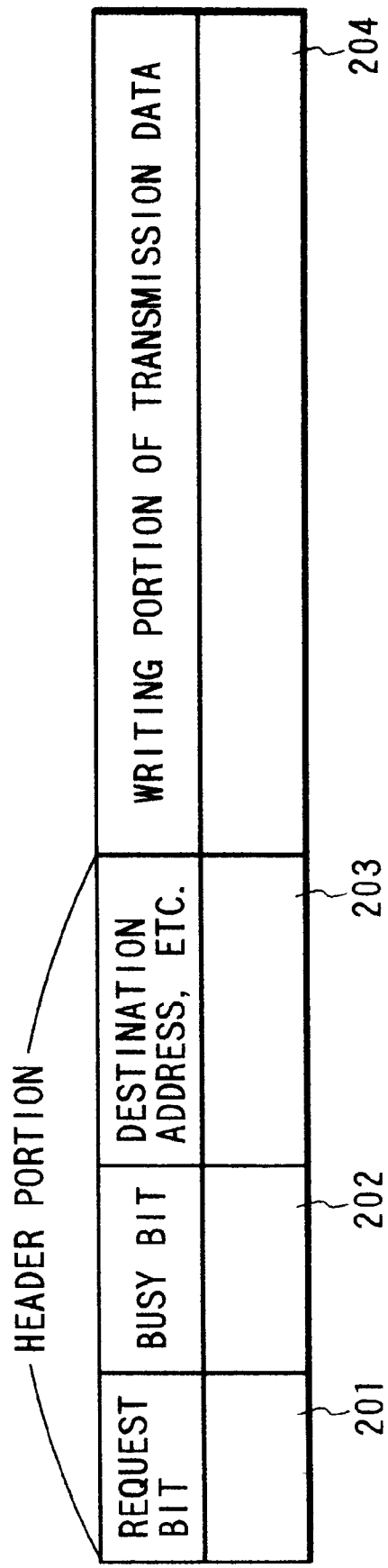
FIG. 2 illustrates the structure of a cell formed based on a DQDB protocol according to the present invention.

FIGS. 1 to 11 show a first embodiment of the present invention. FIG. 1 shows a schematic functional structure of a network of the present invention. FIG. 2 shows the structure of a cell formed based on a DQDB protocol. FIGS. 4 to 11 show the procedure for executing writing into a cell, or the communication operation of transmission data.

Initially, the configuration of a communication network of this embodiment will be described. In FIG. 1, reference numerals 111 to 116 respectively designate wavelength multiplex channels for transmitting a cell therethrough. The speed of each wavelength multiplex channel is 45 Mbps which is based on the DQDB protocol, and thus the transmission capacity of the entire network is 270 Mbps. Reference numeral 121 designates a slot generator for successively sending out empty cells to the wavelength multiplex channels 111 to 113, and reference numeral 122 also designates a slot generator for successively sending out cells to the wavelength multiplex channels 114 to 116. Reference numerals 131 to 137 respectively designate transceiver terminals for transmitting and receiving a cell including transmission and reception data. Reference numerals 151 to 157 respectively designate request counters (RCs) for counting the number of write requests written in cells transmitted through the respective wavelength multiplex channels 114, 115 and 116. In a communication network using an ordinary DQDB protocol, only one channel is provided for each of channels which respectively transmit cells in mutually-opposite directions. In the present invention, however, a plurality of wavelength multiplex channels are provided for each of the channels for transmission in the mutually-opposite directions and those wavelength multiplex channels for each transmission direction are integrated. The request counter of the present invention has a function of counting the number of the write requests written in cells transmitted through the plural wavelength multiplex channels connected to this request counter. The request counter of the present invention differs from a conventional request counter (RC) in that point.

In FIG. 1 of this embodiment, a portion of the structure is omitted for the sake of simple description of this embodiment. In the structure of each terminal in compliance with an ordinary DQDB protocol, request counters (RCs) are respectively provided for channels for rightward and leftward transmissions, so each terminal includes two request counters (RCs). Likewise, in the present invention, there are also arranged request counters for counting write requests written in cells transmitted through the wavelength multiplex channels 111 to 113, though not depicted in FIG. 1.

Reference numerals 161 to 167 respectively designate request count-down counters (RCCs) for the wavelength multiplex channels 114 to 116, to which the count number in each of the request counters (RCs) 151 to 157 can be shifted. Though not depicted in FIG. 1, there are also arranged request count-down counters (RCCs) for the wavelength multiplex channels 111 to 113.

The cell structure, in which write request and transmission data are to be written, will be described with reference to FIG. 2. In FIG. 2, reference numeral 201 designates a section for request bit. Each of the terminals 131 to 137, in which the transmission request is generated, writes the write request, i.e., the request bit 201, in a cell transmitted in a direction opposite to a direction in which the transmission data is to be transmitted. In the following description, it is assumed that all the terminals 131 to 137 transmit transmission data in an up direction. In other words, each of the terminals 131 to 137 transmits a cell having the request bit 201 written therein in a down direction. Reference numeral 202 designates a busy bit. When the busy bit 202 is written in a cell, such a state indicates that transmission data is written in the cell. Reference numeral 203 designates a bit section in which destination address and so forth are to be written. Reference numeral 204 designates a portion in which transmission data for transmission to the destination terminals is to be written.

Figure 3:
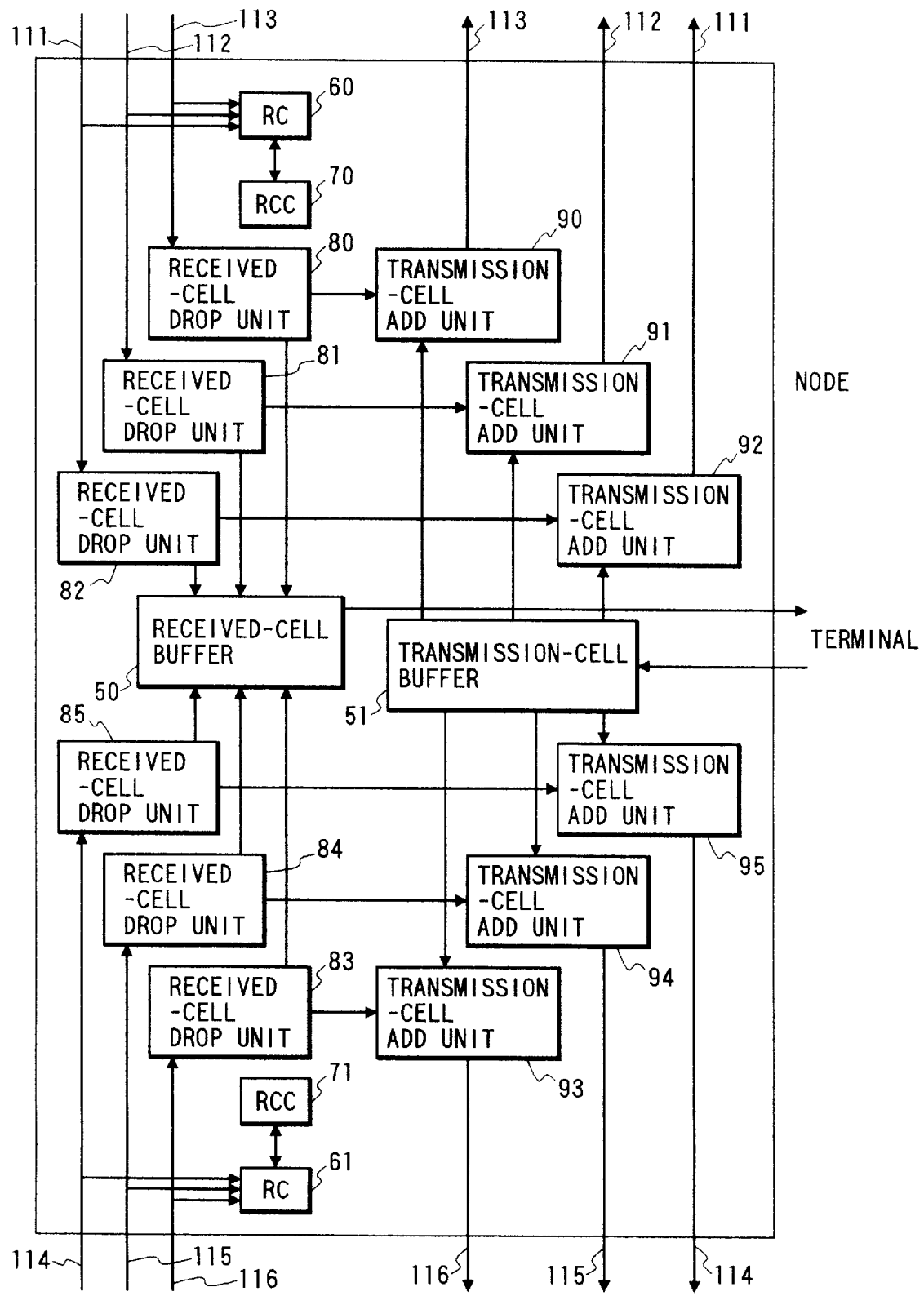
FIG. 3 is a block diagram illustrating the internal structure of a terminal equipment according to the present invention.

An example of the structure of a transceiver terminal equipment used in this embodiment will be described with reference to FIG. 3. In FIG. 3, this transceiver terminal equipment relays the cell transmitted through each of the up-directional wavelength multiplex channels 111 to 113 and re-transmits the cell therethrough. Likewise, the transceiver terminal equipment relays the cell transmitted through each of the down-directional wavelength multiplex channels 114 to 116 and re-transmits the cell therethrough. In FIG. 1, each of the terminals is connected to the respective wavelength multiplex channels in a connection manner illustrated in FIG. 3.

In FIG. 3, reference numeral 61 denotes a request counter (RC) for counting the number of write requests written in the cells transmitted through the respective wavelength multiplex channels 114 to 116. Reference numeral 71 denotes a request count-down counter (RCC) for each of the wavelength multiplex channels 114 to 116, which can shift the count number in the request counter (RC) 61 to this request count-down counter. Reference numerals 80 to 85 respectively denote received-cell drop units for reading a header portion (see FIG. 2) of the cell in each of the wavelength multiplex channels 111 to 116 and separating the cell addressed to this terminal from the cell addressed to another terminal. When the cell is addressed to this terminal, the received-cell drop units 80 to 85 send this cell to a received-cell buffer 50. When addressed to another terminal, the received-cell drop units 80 to 85 send the cell to transmission-cell add units 90 to 95 corresponding to those drop units 80 to 85. The received-cell buffer 50 stores the cell, which is transmitted from the received-cell drop units 80 to 85 and addressed to this terminal, and outputs the received cell to this terminal. The terminal receives the cell addressed thereto and processes data in the cell to a signal.

Reference numeral 51 denotes a transmission-cell buffer for receiving data from the terminal as a cell and sending the cell to the transmission-cell add units 90 to 95. The transmission-cell add units 90 to 95 receive the cell supplied from the transmission-cell buffer 51 and the received-cell drop units 80 to 85 and transmit the cell to the wavelength multiplex channels 111 to 116. The transceiver terminal equipment having such a structure represents each of the terminals 131 to 137 illustrated in FIG. 1. Due to the operations of the above-discussed units, the transceiver terminal equipment takes in data addressed to this terminal, adds data, which is produced in this terminal and addressed to another terminal, to a cell stream of data addressed to another terminal, and sends out the cell stream.

The operation of transmission and reception of the above-discussed terminal equipments will be described with reference to the figures. In FIGS. 4 to 11, reference numerals 301 to 306 respectively designate transceiver terminals having the same structure as that in FIG. 1. Reference numerals 307 and 308 respectively designate slot generators. Reference numerals 311 to 316 respectively designate wavelength multiplex channels for transmitting the cell, which has transmission data written therein and transmitted by the transceiver terminals 301 to 306.

The communication operation of the cell on the multiplex line of the present invention will then be described with reference to FIGS. 4 to 11. In those figures, cells other than the cell having the write request or the transmission data written therein are omitted for the sake of simplicity of understanding. In the following description, terminals located on the side of the slot generator 308 of this terminal will be referred to as an upstream terminal. The request count-down counter (RCC) is simply represented by CC. Further, in those figures, where "1" is written in a portion after a R-written portion of the cell, this number "1" indicates that the downstream terminal generates the request for writing data in the cell. Where "0" is written in the portion after the R-written portion of the cell, this number indicates that no downstream terminal generates the request for writing data in the cell. Further, where "1" is written in a portion before a B-written portion of the cell, this number "1" indicates that the upstream terminal has written data in the cell. Where "0" is written in the portion before the B-written portion of the cell, this number indicates that no upstream terminal has written data in the cell.

It is assumed, for the sake of simple description of the operation, that the respective terminals generate the requests for writing data in the cell in the following manner. Initially, the terminal 305 generates the request for writing transmission data in two cells to transmit the transmission data, for example, to the terminal 306. Then, the terminal 304 generates the request for writing transmission data in two cells to transmit the transmission data to the terminal located downstream of this terminal 304, and the terminal 303 generates the request for writing transmission data in a cell to transmit the transmission data to the terminal located downstream of this terminal 303.

The operation of writing the write request in the transmission cell by the respective terminals 301 to 306 and the count operation of the counters (RC and CC) in each terminal will be described with reference to FIGS. 4 to 6.

Figure 4:
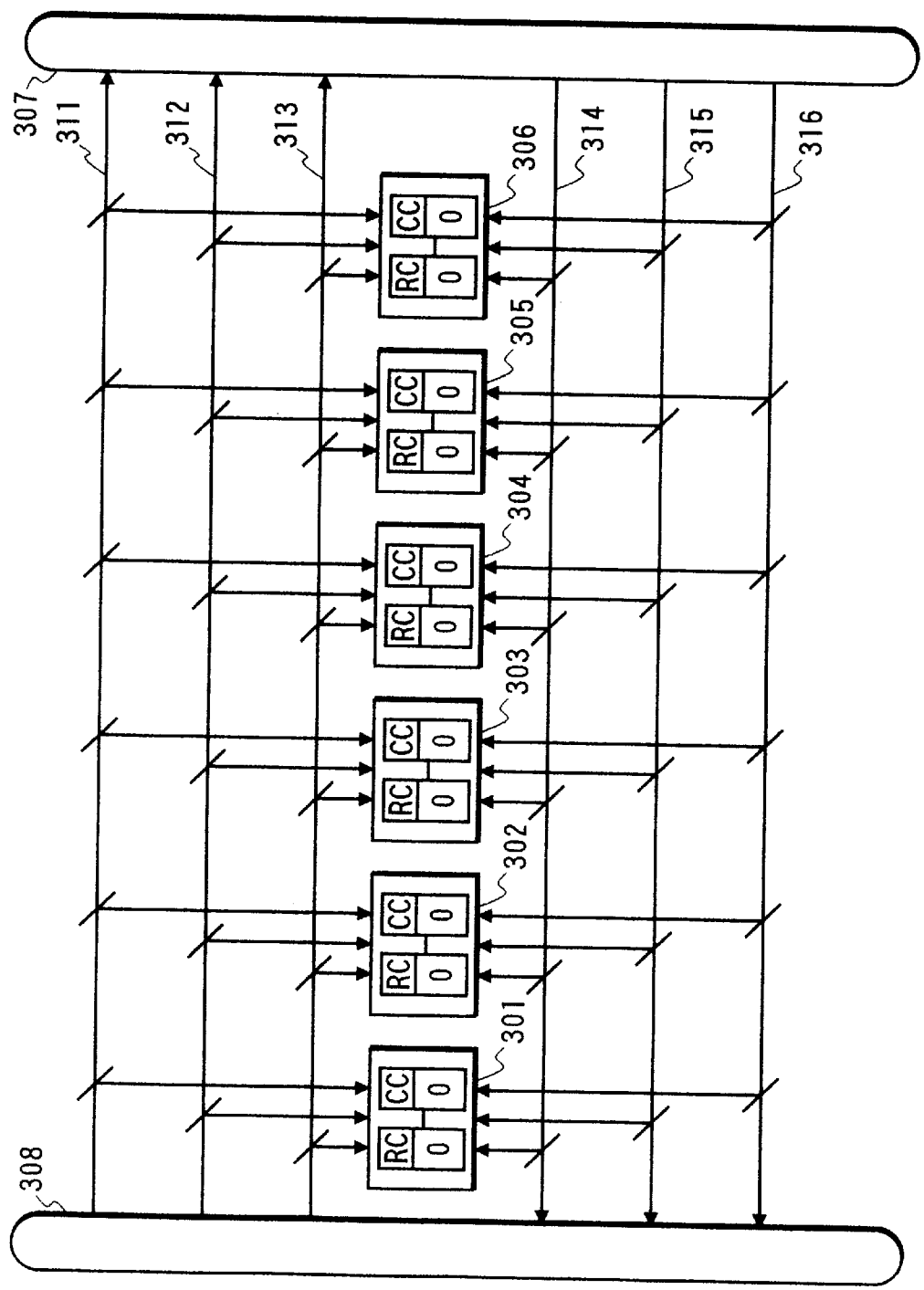
FIG. 4 is a view showing the operation of sending out a write request from each terminal according to the present invention.

[Regarding FIG. 4]

In a state illustrated in FIG. 4, since the counter (RC) in each terminal indicates "0", there is no request for writing data in the cell generated from the terminals. That is, FIG. 4 illustrates the state in which all the terminals, that sent the write requests, have completed the writing of data in the cells.

Figure 5:
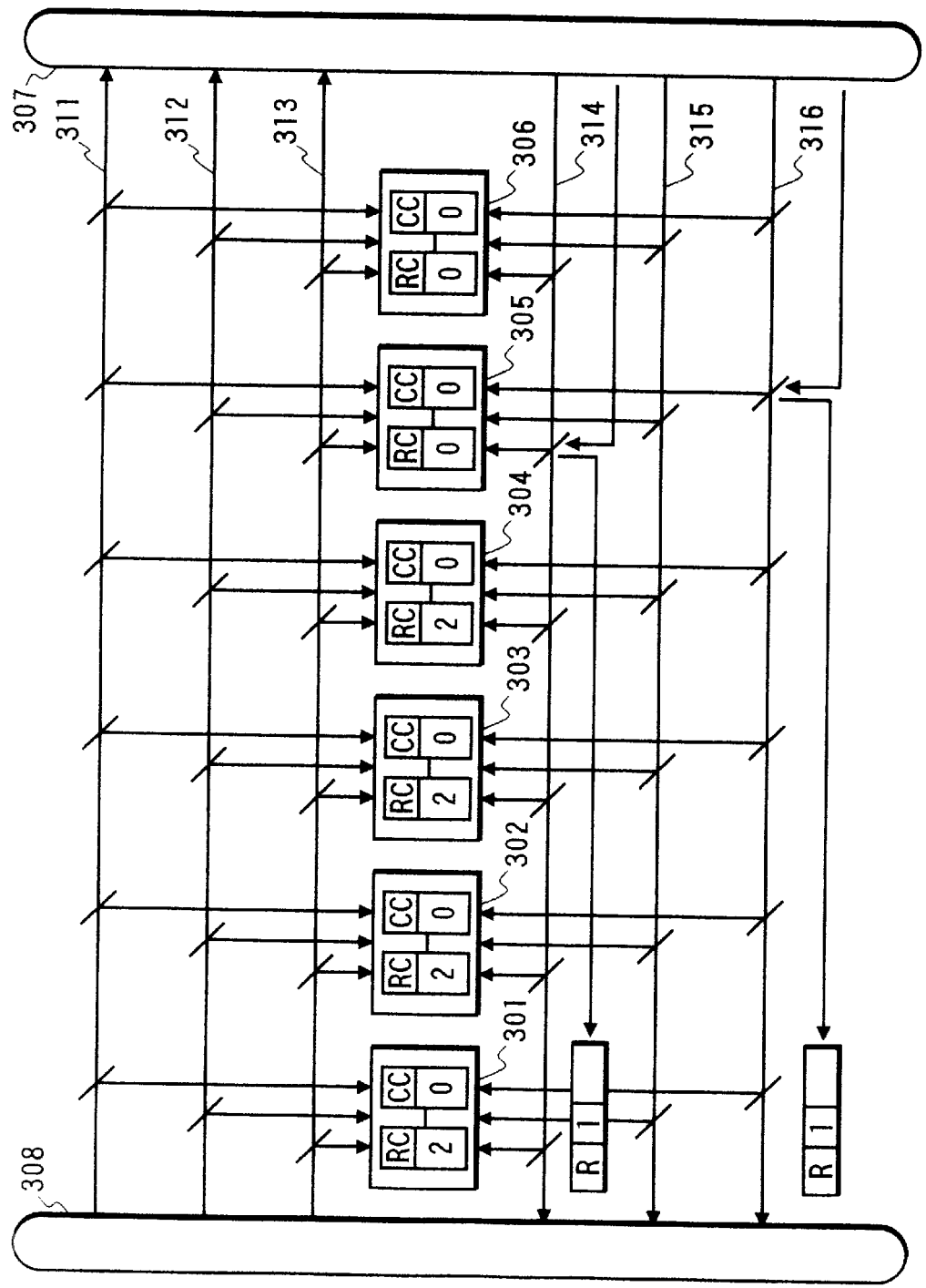
FIG. 5 is a view showing the operation of sending out a write request from each terminal according to the present invention.

[Regarding FIG. 5]

In FIG. 5, the terminal 305, which has generated the request for writing data in the cell to be transmitted to the terminal 306 located downstream thereof, selects two cells having no write request from the cells transmitted through the wavelength multiplex channels 314 to 316, writes the write request in the header portion of the selected cells (i.e., writes the request bit "1") and sends out the two cells in the up direction, in order to notify the terminal located upstream thereof of the request for writing data in two cells. Here, when the description is made using FIG. 3, the transmission-cell add units 93 and 95 respectively write the request bit "1" in the two cells having no request bit written therein, and respectively transmit these two cells to the wavelength multiplex channels 314 and 316.

The terminals 301 to 304 located upstream of the terminal 305 respectively recognize those two write requests by means of "1" in the request bit 201 of the header portion of the two cells transmitted through the wavelength multiplex channels 314 and 316, and add two (2) to the count number of RC in each terminal. Thus, after counting the request bit 201, each terminal can recognize that the number of the terminals out of the terminals located downstream of this terminal, which request the data transmission in the down direction, is two (2). When the description is also made using FIG. 3, the request counter 61 in each of the terminals 301 to 304 reads the request bits 201 in the respective cells transmitted through the wavelength multiplex channels 114 to 116, counts up "1", which is inserted by the write request in the terminals located downstream, and indicates the count "2".

Further, this state indicates the state in which no request for writing data in the cell is generated in the terminal located upstream of the terminal 305. This is because if the request for writing data in the cell was generated in the terminals located upstream of the terminal 305, one of those terminals could write the write request in the cell transmitted through the wavelength multiplex channel 315.

Figure 6:
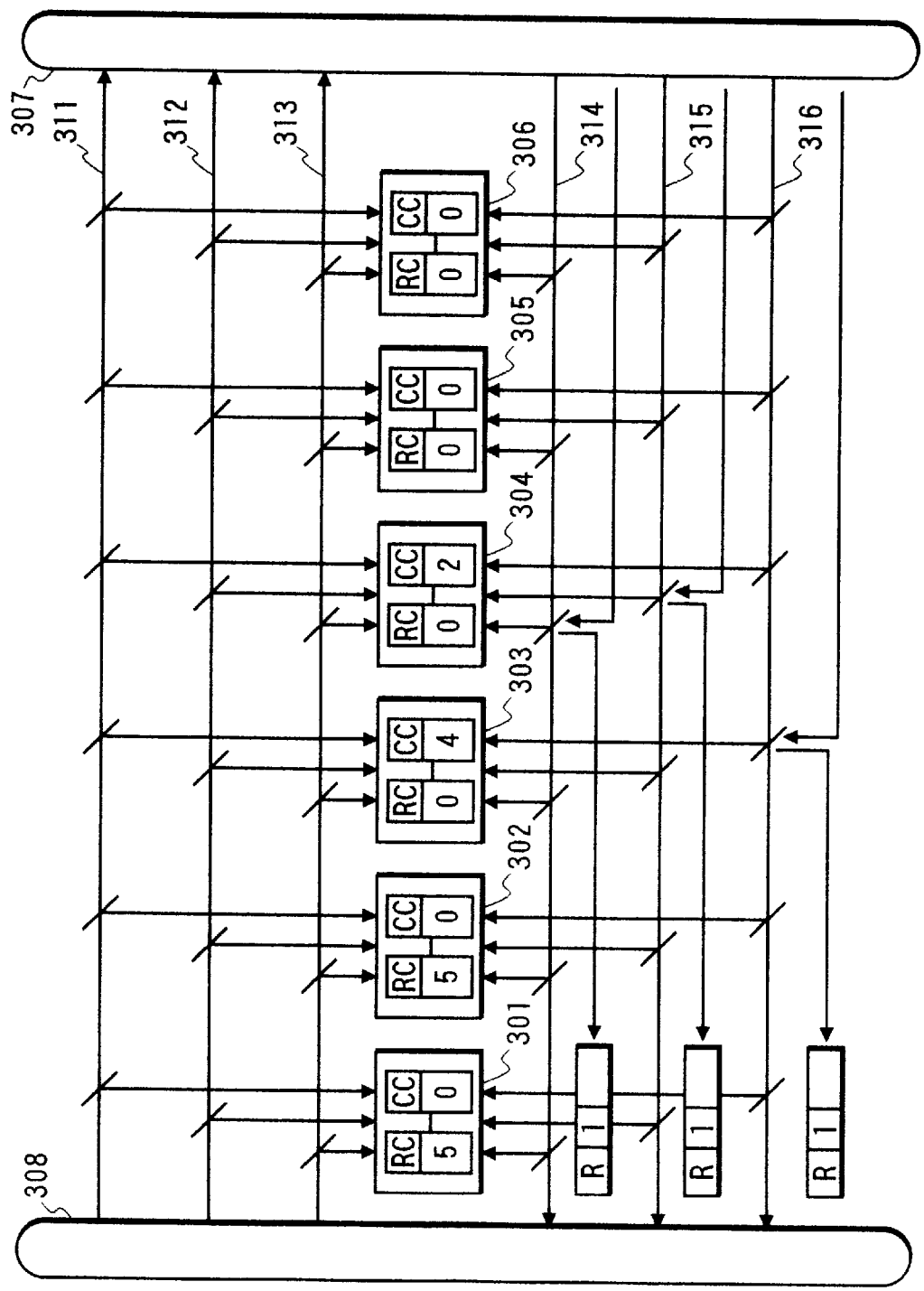
FIG. 6 is a view showing the operation of sending out a write request from each terminal according to the present invention.

[Regarding FIG. 6—terminal 304]

The terminal 304, which generates the request for writing data in two cells, writes the write requests in the header portions of the cells transmitted through the wavelength multiplex channels 314 and 315 (i.e., writes "1" in the request bit 201), sends out these cells in the up direction and shifts the value "2" in the request counter (RC) to the request count-down counter (CC). Thus, the terminal 304 can memorize the fact that the terminals located downstream of this terminal 304 sent out two write requests before this terminal 304 generates the write request.

[FIG. 6—terminal 303]

The terminal 303 reads the cells, in each of which the write request is written by the terminal 304 and which are respectively transmitted through the wavelength multiplex channels 314 and 315, adds two (2) to "2" in RC of this terminal 303 and changes the count number in RC to "4". Then, the terminal 303 writes the write request in the header portion of the cell transmitted through the wavelength multiplex channel 316 (i.e., writes the request bit "1"), sends out this cell in the up direction and shifts the value "4" in the request counter (RC) to the request count-down counter (CC). Thus, the terminal 303 can recognize the fact that the terminals located downstream of this terminal 303 sent out four write requests before this terminal generates the write request.

Each of the terminals located upstream of the terminal 303 reads the request bits "1" or the write requests in the header portions of the three transmitted cells, and adds three (3) to the number in RC of this terminal. Hence, each of the terminals 301 and 302 recognizes the fact that the number of the terminals out of the terminals located downstream of this terminal, which desire to transmit data in the down direction, is five (5).

Next, the control operation will be described, which is performed with respect to the reception of the cell on the wavelength multiplex channels to which the respective terminals are going to transmit data. Control algorisms in the terminal, which generates the write request, and in the terminal, which generates no write request, are respectively represented by {1} and {2}).

{1} In the terminal which generates the request for writing data in the cell, the algorism for controlling the writing at the time when this terminal receives the cell is as follows. The control is performed in the order of the following [1] and [2]. Here, x indicates the number of write-performable cells out of the received cells, y indicates the count value of RCC, z indicates the count value of RC and v indicates the number of the write requests in the terminals. In the write-performable cell, no transmission data is written and the busy bit in the header portion thereof is zero (0) or indicates an OFF state.

[1] The terminal, which receives the cell, executes the control under an applicable condition out of the following conditions (a) to (d), and changes the count values of RC and RCC.

(a) If the count value y of RCC is equal to or larger than the number x of the write-performable cells, the value x is subtracted from the count value y of RCC.

(b) If the count value y of RCC is smaller than the number x of the write-performable cells and the count value z of RC is equal to zero (0), the count value of RCC is set to zero (0).

(c) If the count value y of RCC is smaller than the number x of the write-performable cells, the count value z of RC is larger than zero (0) and the value of (x−y) is larger than the number v of the write requests in this terminal, the count value of RCC is set to zero (0) and the value of (x−y−v) is subtracted from the count value z of RC.

(d) If the count value y of RCC is smaller than the number x of the write-performable cells, the count value z of RC is larger than zero (0) and the value of (x−y) is smaller than the number v of the write requests in this terminal, the count value of RCC is set to zero (0).

Since the value of each counter indicates the number of requests from the terminals, the count value thereof is always set to zero (0) when the count value becomes negative by the respective controls.

[2] The terminal, which has changed the count values, executes the writing control to the cell corresponding to the conditions (a) to (d) in [1]. So, the terminal, which has performed the control (c) in [1], executes control (c) in [2].

(a) The terminal allows the write-performable cell to pass.

(b-1) If the value (x−y) is equal to or larger than the number v of the write requests in this terminal, the terminal writes transmission data in the write-performable cells whose number amounts to the number of the write requests generated in this terminal.

(b-2) If the value (x−y) is smaller than the number v of the write requests in this terminal, the terminal writes transmission data in the write-performable cells whose number is the value of (x−y). Then, the terminal changes the number of the write requests in this terminal to the value of (v−x−y).

(c) All of the write requests generated in this terminal are satisfied, and the terminal writes transmission data in v numbered write-performable cells.

(d) The terminal writes transmission data in (x−y) numbered write-performable cells, and changes the number of the write requests in this terminal to the value of (v−x−y).

{2} The terminal, which generates no request for acquiring the channel, subtracts the number of the write-performable cells from the count value of RC.

The foregoing is the control algorism at the time of receiving the cell.

Figure 7:
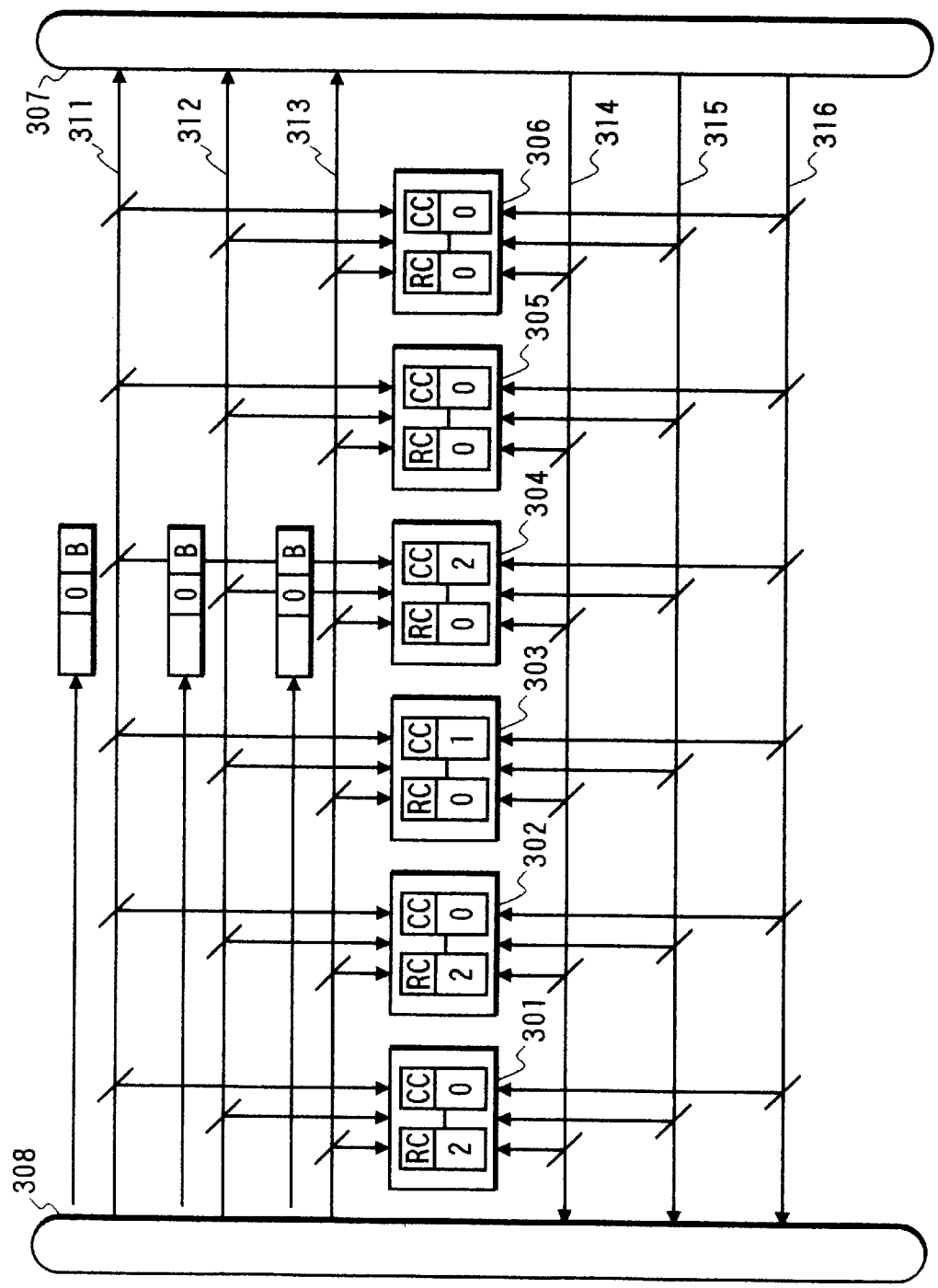
FIG. 7 is a view showing the operation of writing transmission data by each terminal according to the present invention.
Figure 8:
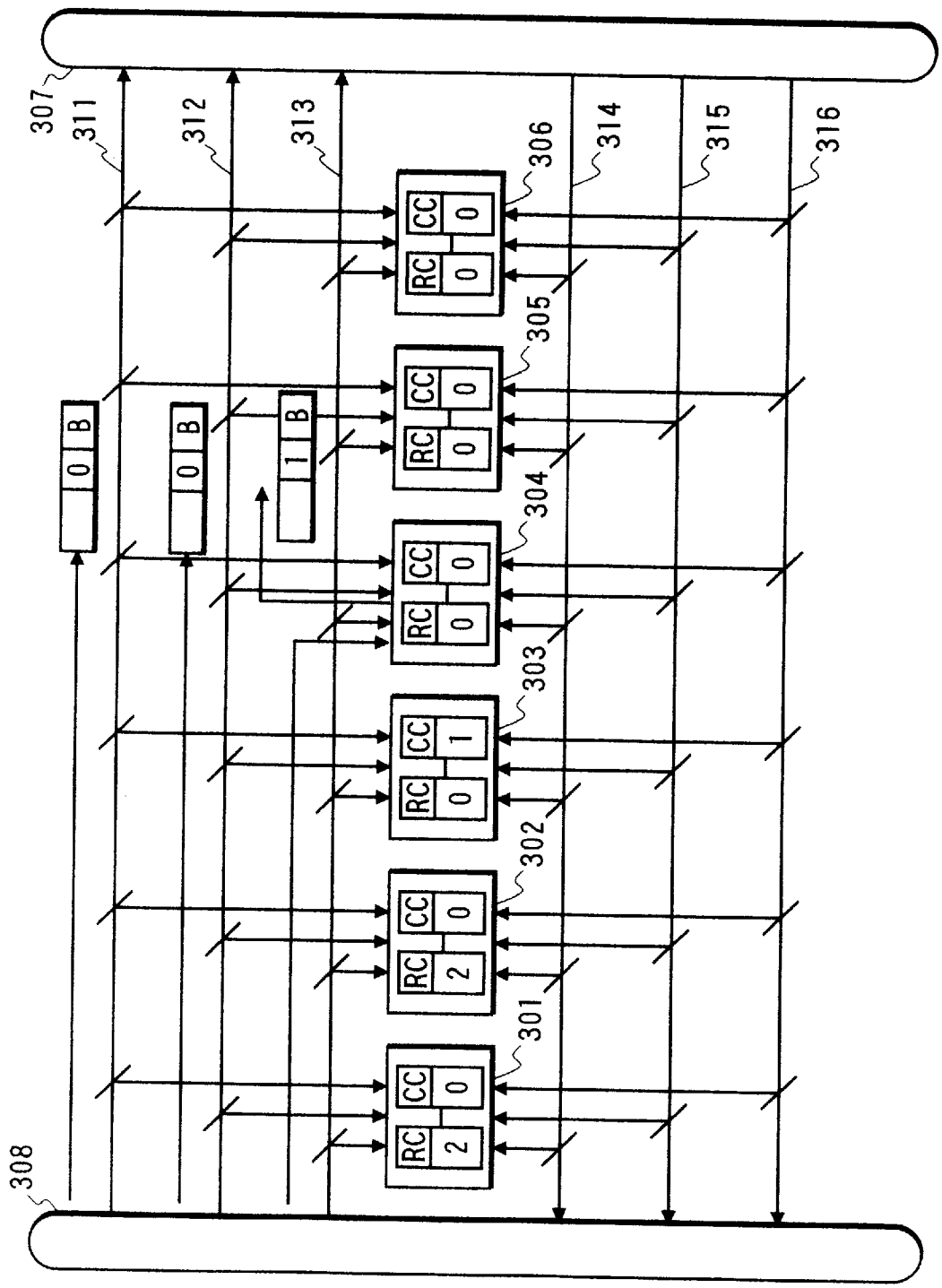
FIG. 8 is a view showing the operation of writing transmission data by each terminal according to the present invention.
Figure 9:
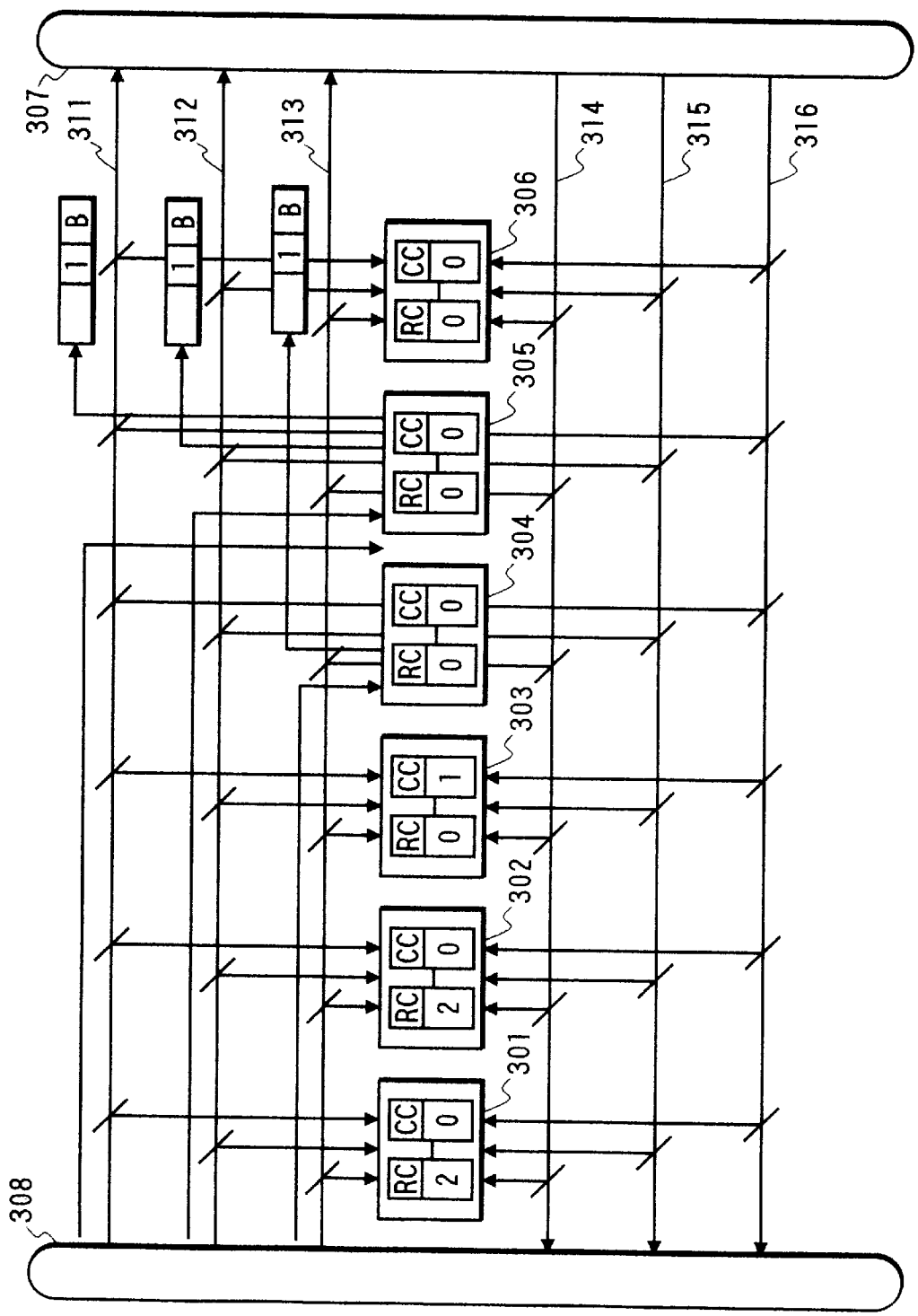
FIG. 9 is a view showing the operation of writing transmission data by each terminal according to the present invention.

Next, the description will be made, using FIGS. 7 to 11, of how each terminal in the network performs the writing control to the cell. In FIGS. 7 to 9, the cell on each transmission channel designates the same cell, and there is illustrated how each cell is transmitted from the slot generator 308 to the slot generator 307. Similarly, in FIGS. 10 and 11, the cell on each channel designates the same cell.

[Terminals 301 and 302 in FIG. 7]

Since x=3, y=0, z=5 and v=0 in these terminals 301 and 302 and the terminals generate no request for acquiring the channel, the control {2} is performed and the number (x=3) of the write-performable cells transmitted through the wavelength multiplex channels 311, 312 and 313 is subtracted from the count value (z=5) of RC. As a result, the count value of RC in each terminal is changed from five (5) to two (2).

[Terminal 303 in FIG. 7]

Since x=3, y=4, z=0 and v=1 in the terminal 303, the control {1} [1] (a) and the control {1} [2] (a) are performed and the number of the write-performable cells transmitted through the wavelength multiplex channels 311, 312 and 313 is subtracted from the count value of RCC. As a result, the count value of RCC in this terminal is changed from four (4) to one (1).

[Terminal 304 in FIG. 8]

Since x=3, y=2, z=0 and v=2 in the terminal 304, the control {1} [1] (b) and the control {1} [2] (b-2) are performed, the count value of RCC is changed from two (2) to zero (0) and the terminal 304 writes transmission data in the write-performable cell transmitted through the wavelength multiplex channel 313 to send it out. Therefore, one write request in the terminal 304 is satisfied, while the other write request remains unsatisfied. As a result, the count value of RC is zero (0) and the count value of RCC is also changed to zero (0).

[Terminal 305 in FIG. 9]

Since x=2, y=0, z=0 and v=2 in the terminal 305, the control {1} [1] (b) and the control {1} [2] (b-1) are performed, the terminal 305 writes transmission data in two write-performable cells transmitted through the wavelength multiplex channels 311 and 312 to send them out. Therefore, all the write requests in the terminal 305 are satisfied.

Figure 10:
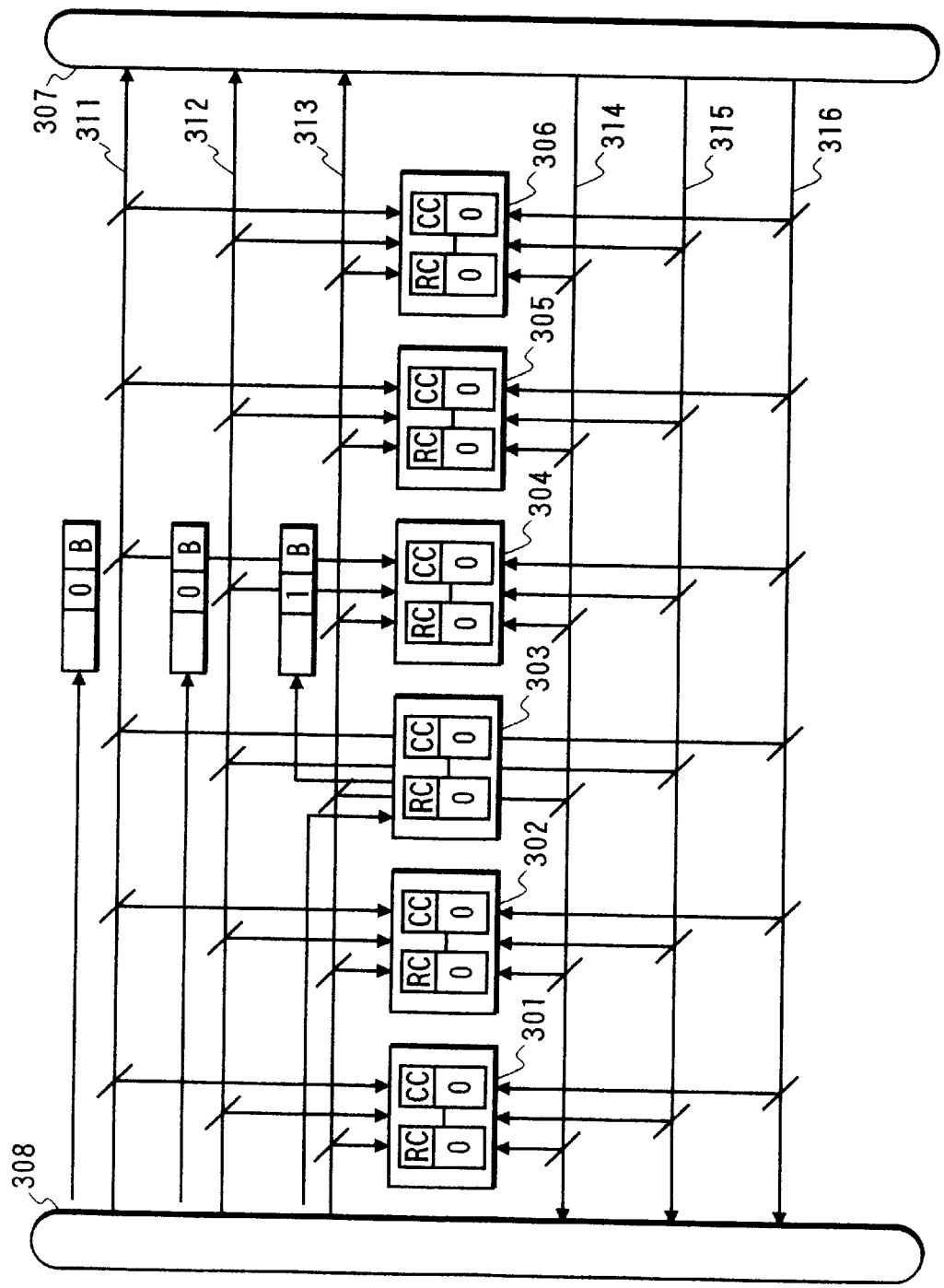
FIG. 10 is a view showing the operation of writing transmission data by each terminal according to the present invention.

[Terminals 301 and 302 in FIG. 10]

Since x=3, y=0, z=2 and v=0 in these terminal 301 and 302, the control {2} is performed and each terminal subtracts the number of the write-performable cells transmitted through the wavelength multiplex channels 311, 312 and 313 from the count value of RC. As a result, the count value of RC in each terminal is changed from two (2) to zero (0). Here, it should be noted that the count value of the counter never becomes negative.

[Terminal 303 in FIG. 10]

Since x=3, y=1, z=0 and v=1 in the terminal 303, the control {1} [1] (b) and the control {1} [2] (b-1) are performed, the terminal 303 changes the count value of RCC from one (1) to zero (0) and the terminal 303 writes transmission data in the write-performable cell transmitted through the wavelength multiplex channel 313 to send it out. Thus, all the write requests in the terminal 303 has been satisfied.

[Terminal 304 in FIG. 11]

Since x=2, y=0, z=0 and v=1 in the terminal 304, the control {1} [1] (b) and the control {1} [2] (b-1) are performed and the terminal 304 writes transmission data in the write-performable cell transmitted through the wavelength multiplex channel 312 to send it out. Thus, all the write requests in the terminal 304 has been satisfied.

The destination address in the header portion of the transmitted cell having transmission data written therein is identified in the addressed terminal, and the cell is received by the destination terminal.

Thus, the multiplex communication channels are controlled by using a common communication protocol, so that all the channels can be used as if they were a single channel and hence it is possible to effectively use the total transmission capacity of the system.

[Second Embodiment]

The concept of the present invention can be embodied by controlling spatially-multiplexed communication channels under a single DQDB protocol. In the above-discussed first embodiment, the connection is conducted by using two optical fibers and wavelength division multiplexing system, but the multiplexing system is not limited to such a system. Each of the respective channels 311 to 316 can be replaced by an optical fiber.

As described in the foregoing, all the multiplex communication channels are controlled by using a common communication protocol, while the respective channels are conventionally controlled by communication protocols corresponding to these channels. Further, the count or pass of the cell is performed under the condition that the respective channels are integrated. Hence, all the multiplex channels can be evenly used and the total transmission capacity can be effectively used in the system.

What is claimed is:

1. A transmission method in a network system in which a plurality of terminals are serially connected using a multiplex line, which includes n numbered first channel or channels for transmitting a cell in a first direction and m numbered second channel or channels for transmitting a cell in a second direction, which is opposite to the first direction, where n and m are respectively natural numbers and at least one of n and m is equal to or more than two, said transmission method comprising:

a first writing step of causing a terminal out of the plurality of the terminals, which has a request for writing data in a cell transmitted through the second channel, to write a write request in a cell transmitted through the first channel and having no write request written therein, and send out this cell having the write request written therein;

a first counting step of causing each of the plurality of the terminals to count the number of a cell or cells having the write request written therein and transmitted through the first channel or channels;

a second writing step of causing the terminal, which has sent out the cell having the write request written therein, to write data in a write-performable cell transmitted through the second channel and send out this cell after allowing a write-performable cell or cells transmitted through the second channel or channels to pass, the number of the passing write-performable cell or cells being equal to the number of the cell or cells having the write request written therein, transmitted through the first channel or channels and counted before this terminal sends out the cell having the write request written therein;

a third writing step of causing a terminal out of the plurality of the terminals, which has a request for writing data in a cell transmitted through the first channel, to write a write request in a cell transmitted through the second channel and having no write request written therein, and send out this cell having the write request written therein:

a second counting step of causing each of the plurality of the terminals to count the number of a cell or cells transmitted through the second channel or channels and having the write request written therein; and a fourth writing step of causing the terminal, which has written the write request in the cell transmitted through the second channel and having no write request and has sent out this cell having the write request written therein, to write data in a write-performable cell transmitted through the first channel and send out this cell after allowing a write-performable cell or cells transmitted through the first channel or channels to pass, the number of the passing write-performable cell or cells being equal to the number of the cell or cells having the write request written therein, transmitted through the second channel or channels and counted before this terminal sends out the cell having the write request written therein.

2. A transmission method according to claim 1, wherein the natural number of n is equal to or more than two, and in said counting step the terminal counts the sum of the numbers of the cell or cells transmitted through the respective first channels and having the write request written therein.

3. A transmission method according to claim 1, wherein the natural number of m is equal to or more than two, and in said second writing step the terminal allows the write-performable cell or cells to pass until the sum of the numbers of the write-performable cell or cells transmitted through the respective second channels amounts to the number of the cell or cells transmitted through the first channel or channels, having the write request written therein and counted by this terminal before this terminal sends out the cell having the write request written therein.

4. A transmission method according to claim 1, wherein the natural numbers of n and m are respectively equal to or more than two, in said counting step the counting is performed by counting the sum of the numbers of the cell or cells transmitted through the respective first channels and having the write request written therein, and in said second writing step the terminal allows the write-performable cell or cells to pass until the sum of the numbers of the write-performable cell or cells transmitted on the respective second channels amounts to the number of the cell or cells transmitted through the first channels, having the write request written therein and counted by this terminal before this terminal sends out the cell having the write request written therein.

5. A transmission method according to claim 1, wherein the natural numbers of n and m are equal to each other.

6. A transmission method according to claim 1, wherein in said counting step, the terminal includes two counters of first and second counters, the first counter counts the number of the cell or cells transmitted through the first channel or channels and having the write request written therein, and a value counted by the first counter is shifted to the second counter when this terminal writes the write request in the cell transmitted through the first channel and having no write request therein and sends out this cell having the write request therein, so that said counting step can be performed in such a manner that a count at the time before this terminal writes the write request in the cell having no write request therein and sends out this cell is distinguished from a count at the time after this terminal writes the write request in the cell having no write request therein and sends out this cell.

7. A transmission method according to claim 1, wherein in said second counting step, the terminal includes two counters of first and second counters, the first counter counts the number of the cell or cells transmitted through the second channel or channels and having the write request written therein, and a value counted by the first counter is shifted to the second counter when this terminal writes the write request in the cell transmitted through the second channel and having no write request therein and sends out this cell having the write request therein, so that said second counting step can be performed in such a manner that a count at the time before this terminal writes the write request in the cell having no write request therein and sends out this cell is distinguished from a count at the time after this terminal writes the write request in the cell having no write request therein and sends out this cell.

8. A network system for transmitting a cell through a multiplex line, said network system comprising:

a plurality of terminals; and a multiplex line, said multiplex line including n numbered first channel or channels for transmitting a cell in a first direction and m numbered second channel or channels for transmitting a cell in a second direction, which is opposite to the first direction, where n and m are respectively natural numbers and at least one of n and m is equal to or more than two, the plurality of said terminals being serially connected by said multiplex line;

wherein each of said terminals includes:

first writing means for writing a write request in a cell transmitted through said first channel and having no write request written therein to send out this cell having the write request written therein when a request for writing data in a cell transmitted through said second channel occurs;

a first counter for counting the number of a cell or cells having the write request written therein and transmitted through said first channel or channels;

second writing means for writing data in a write-performable cell transmitted through said second channel after allowing a write-performable cell or cells transmitted through the second channel or channels to pass, while monitoring the cell or cells transmitted through said second channel or channels, the number of the passing write-performable cell or cells being equal to the number of the cell or cells having the write request written therein, transmitted through said first channel or channels and counted before this terminal sends out the cell having the write request written therein;

third writing means for writing a write request in a cell transmitted through said second channel and having no write request written therein to send out this cell having the write request written therein when a request for writing data in the cell transmitted through said first channel occurs:

a second counter for counting the number of a cell or cells transmitted through said second channel or channels and having the write request written therein; and fourth writing means for writing data in a write-performable cell transmitted through said first channel after allowing a write-performable cell or cells transmitted through said first channel or channels to pass, the number of the passing write-performable cell or cells being equal to the number of the cell or cells having the write request written therein, transmitted through said second channel or channels and counted before this terminal sends out the cell having the write request written therein.

9. A network system according to claim 8, wherein the natural number of n is equal to or more than two, and said counter counts the sum of the numbers of the cell or cells transmitted through said respective first channels and having the write request written therein.

10. A network system according to claim 8, wherein the natural number of m is equal to or more than two, and said second writing means allows the write-performable cell or cells to pass until the sum of the numbers of the write-performable cell or cells transmitted through said respective second channels amounts to the number of the cell or cells transmitted through said first channel or channels, having the write request written therein and counted by this terminal before this terminal sends out the cell having the write request written therein, and afterwards writes data in the write-performable cell transmitted through said second channel.

11. A network system according to claim 8, wherein the natural numbers of n and m are respectively equal to or more than two, said counter counts the sum of the numbers of the cell or cells transmitted through said respective first channels and having the write request written therein, and said second writing means allows the write-performable cell or cells to pass until the sum of the numbers of the write-performable cell or cells transmitted on said respective second channels amounts to the number of the cell or cells transmitted through said first channels, having the write request written therein and counted by this terminal before this terminal sends out the cell having the write request written therein, and afterwards writes data in the write-performable cell transmitted through said second channel.

12. A network system according to claim 8, wherein the natural numbers of n and m are equal to each other.

13. A network system according to claim 8, wherein said counter includes two counters of first and second counters, said first counter counting the number of the cell or cells transmitted through said first channel or channels and having the write request written therein, and said counter performs counting in such a manner that a value counted by said first counter is shifted to said second counter when this terminal writes the write request in the cell transmitted through said first channel and having no write request therein and sends out this cell having the write request therein, so that a count at the time before this terminal writes the write request in the cell having no write request therein and sends out this cell is distinguished from a count at the time after this terminal writes the write request in the cell having no write request therein and sends out this cell.

14. A network system according to claim 8, wherein said counter includes two counters of first and second counters, said first counter counting the number of the cell or cells transmitted through said second channel or channels and having the write request written therein, and said counter performs counting in such a manner that a value counted by said first counter is shifted to said second counter when this terminal writes the write request in the cell transmitted through said second channel and having no write request therein and sends out this cell having the write request therein, so that a count at the time before this terminal writes the write request in the cell having no write request therein and sends out this cell is distinguished from a count at the time after this terminal writes the write request in the cell having no write request therein and sends out this cell.

15. A terminal equipment used in a network system in which a plurality of terminals are serially connected using a multiplex line, which includes n numbered first channel or channels for transmitting a cell in a first direction and m numbered second channel or channels for transmitting a cell in a second direction, which is opposite to the first direction, where n and m are respectively natural numbers and at least one of n and m is equal to or more than two, said terminal comprising:

first writing means for writing a write request in a cell transmitted through the first channel and having no write request written therein to send out this cell having the write request written therein when a request for writing data in a cell transmitted through the second channel occurs;

a first counter for counting the number of a cell or cells having the write request written therein and transmitted through the first channel or channels;

second writing means for writing data in a write-performable cell transmitted through the second channel after allowing a write-performable cell or cells transmitted through the second channel or channels to pass, while monitoring the cell or cells transmitted through the second channel or channels, the number of the passing write-performable cell or cells being equal to the number of the cell or cells having the write request written therein, transmitted through the first channel or channels and counted before this terminal sends out the cell having the write request written therein;

third writing means for writing a write request in a cell transmitted through the second channel and having no write request written therein to send out this cell having the write request written therein when a request for writing data in the cell transmitted through the first channel occurs:

a second counter for counting the number of a cell or cells transmitted through the second channel or channels and having the write request written therein; and fourth writing means for writing data in a write-performable cell transmitted through the first channel after allowing a write-performable cell or cells transmitted through the first channel or channels to pass, the number of the passing write-performable cell or cells being equal to the number of the cell or cells having the write request written therein, transmitted through the second channel or channels and counted before this terminal sends out the cell having the write request written therein.

16. A terminal equipment according to claim 15, wherein the natural number of n is equal to or more than two, and said counter counts the sum of the numbers of the cell or cells transmitted through the respective first channels and having the write request written therein.

17. A terminal equipment according to claim 15, wherein the natural number of m is equal to or more than two, and said second writing means allows the write-performable cell or cells to pass until the sum of the numbers of the write-performable cell or cells transmitted through the respective second channels amounts to the number of the cell or cells transmitted through the first channel or channels, having the write request written therein and counted by this terminal before this terminal sends out the cell having the write request written therein, and afterwards writes data in the write-performable cell transmitted through the second channel.

18. A terminal equipment according to claim 15, wherein the natural numbers of n and m are respectively equal to or more than two, said counter counts the sum of the numbers of the cell or cells transmitted through the respective first channels and having the write request written therein, and said second writing means allows the write-performable cell or cells to pass until the sum of the numbers of the write-performable cell or cells transmitted on the respective second channels amounts to the number of the cell or cells transmitted through the first channels, having the write request written therein and counted by this terminal before this terminal sends out the cell having the write request written therein, and afterwards writes data in the write-performable cell transmitted through the second channel.

19. A terminal equipment according to claim 15, wherein the natural numbers of n and m are equal to each other.

20. A terminal equipment according to claim 15, wherein said counter includes two counters of first and second counters, said first counter counting the number of the cell or cells transmitted through the first channel or channels and having the write request written therein, and said counter performs counting in such a manner that a value counted by said first counter is shifted to said second counter when this terminal writes the write request in the cell transmitted through the first channel and having no write request therein and sends out this cell having the write request therein, so that a count at the time before this terminal writes the write request in the cell having no write request therein and sends out this cell is distinguished from a count at the time after this terminal writes the write request in the cell having no write request therein and sends out this cell.

21. A terminal equipment according to claim 15, wherein said counter includes two counters of first and second counters, said first counter counting the number of the cell or cells transmitted through the second channel or channels and having the write request written therein, and said counter performs counting in such a manner that a value counted by said first counter is shifted to said second counter when this terminal writes the write request in the cell transmitted through the second channel and having no write request therein and sends out this cell having the write request written therein, so that a count at the time before this terminal writes the write request in the cell having no write request therein and sends out this cell is distinguished from a count at the time after this terminal writes the write request in the cell having no write request therein and sends out this cell.

22. A network terminal equipment which writes requests in first cells and sends out these cells in order to request to write data in cells on a network and thereafter writes the data in second cells, said terminal equipment comprising:

first means for counting the number of the requests on the network before sending out the first cells and for holding the number as a first counted value;

second means for counting the number of the second cells and for holding the number as a second counted value; and third means for specifying second cells in which the data are written, using the first and second counted values,
wherein the first cells and the second cells exist on respective different channel sections, the channel section on which at least the first cells exist consisting of a plurality of channels, and wherein said first means sums the first cells on the plurality of channels.

23. A method for use in a terminal equipment which writes requests in first cells and sends out these cells in order to request to write data in cells on a network and thereafter writes the data in second cells, method comprising the steps of:

counting the number of the requests on the network before sending out the first cells and for the holding number as a first counted value;

counting the number of the second cells and for holding the number as a second counted value; and specifying second cells in which the data are written, using the first and second counted values,
wherein the first cells and the second cells exist on respective different channel sections, the channel section on which at least the first cells exist consisting of a plurality of channels, and wherein said first counting step sums the first cells on the plurality of channels.

24. A transmission medium in which requests are written in first cells and these cells are sent out in order to request to write data in cells on a network and thereafter the data are written in second cells, said transmission medium being characterized in that:

(A) the number of the requests on the network is counted before sending out the first cells and held as a first counted value;

(B) the number of the second cells is counted and held as a second counted value; and (C) second cells in which the data is written are specified using the first and second counted values,
wherein the first cells and the second cells exist on respective different channel sections, the channel section on which at least the first cells exist consists of a plurality of channels, and in said item (A) the first cells on the plurality of channels are summed.

* * * * *

UNITED STATES PATENT AND TRADEMARK OFFICE
CERTIFICATE OF CORRECTION

PATENT NO. : 5,987,006

DATED : November 16, 1999

INVENTOR(S) : KAZUHIKO HOUJOU

It is certified that error appears in the above-identified patent and that said Letters Patent is hereby corrected as shown below:

COLUMN 6

Line 34, "then" should be deleted.

COLUMN 8

Line 21, "{2})." should read --{2}.--.

COLUMN 9

Line 60, "terminal 301" should read --terminals 301--.

COLUMN 10

Line 7, "has" should read --have--.
   Line 15, "has" should read --have--.

COLUMN 13

Line 4, "occurs:" should read --occurs;--.

COLUMN 14

Line 51, "occurs:" should read --occurs;--.

UNITED STATES PATENT AND TRADEMARK OFFICE
CERTIFICATE OF CORRECTION

PATENT NO. : 5,987,006

DATED : November 16, 1999

INVENTOR(S) : KAZUHIKO HOUJOU

It is certified that error appears in the above-identified patent and that said Letters Patent is hereby corrected as shown below:

COLUMN 16

Line 23, "method" should read --said method--.

Signed and Sealed this

Third Day of October, 2000

Attest:

Q. TODD DICKINSON

*Attesting Officer*  *Director of Patents and Trademarks*